United States Patent [19]

Stickling

[11] Patent Number: 5,525,179
[45] Date of Patent: Jun. 11, 1996

[54] METHOD OF MANUFACTURING A LINING PART

[75] Inventor: Heinz Stickling, Vorbach, Germany

[73] Assignee: Empe-Werke Ernst Pelz GmbH & Co. KG, Germany

[21] Appl. No.: 276,198

[22] Filed: Jul. 18, 1994

[51] Int. Cl.⁶ .................................... B29C 39/12
[52] U.S. Cl. .................... 156/245; 264/247; 264/251; 264/254; 264/328.8
[58] Field of Search .................... 264/247, 251, 264/254, 267, 269, 328.7, 328.8; 428/31, 106, 537.1; 156/242, 245

[56] References Cited

U.S. PATENT DOCUMENTS

| | | | |
|---|---|---|---|
| 3,246,066 | 4/1966 | Gits | 264/132 |
| 3,312,197 | 4/1967 | Smith | 40/358 |
| 3,654,062 | 4/1972 | Loew | 428/164 |
| 3,972,974 | 8/1976 | Pico | 264/269 |
| 4,460,534 | 7/1984 | Boehm et al. | 264/269 |
| 4,885,121 | 12/1989 | Patel | 264/328.8 |
| 4,985,194 | 1/1991 | Watanabe | 264/247 |
| 5,183,615 | 2/1993 | Zushi | 264/328.7 |
| 5,275,764 | 1/1994 | Hettinga | 264/247 |
| 5,338,592 | 8/1994 | Ohsumi et al. | 156/242 |
| 5,350,608 | 9/1994 | Zoller | 428/31 |

FOREIGN PATENT DOCUMENTS

| | | |
|---|---|---|
| 4023209 | 1/1991 | Germany. |
| 4124297 | 1/1993 | Germany. |

OTHER PUBLICATIONS

English Language Abstract of DE 4124297.
*Zweifarben–Spritzgiessen*, Arburg Maschinenfabrik, Hehl & Söhne, Oct. 1979, pp. 1–6.

Primary Examiner—Jeff H. Aftergut
Assistant Examiner—Richard Crispino
Attorney, Agent, or Firm—Hill, Steadman & Simpson

[57] ABSTRACT

A method of manufacturing a lining part having a blank with a back reinforcing surface layer and a front reinforcing surface layer comprises assembling the blank on a molding surface of a first molding part, assembling a second molding part on the first molding part having a cavity adjacent a back surface of the blank, injection molding a back surface layer for reinforcing the blank, removing the first molding part and replacing it with a third molding part having a cavity adjacent the front surface of the blank and injection molding the front surface layer.

10 Claims, 2 Drawing Sheets

METHOD OF MANUFACTURING A LINING PART

BACKGROUND OF THE INVENTION

The present invention is directed to a method of manufacturing a lining part having a viewing or front side and a back side, wherein a blank that already has its ultimate shape in the unstressed condition, but is not independently shape-stable, for example a pre-formed and/or profiled wood veneer part provided with ornaments, written characters or the like, has its back side provided with a reinforcing layer and has its viewing or front side equipped with an at least partially transparent front surface coating with optical surface qualities by injection molding composed of a chase and top flask or two molding parts. The invention is also directed to the lining part particularly manufactured according to this method, which is composed of a blank, such as a wood veneer part or the like that has its back side provided with a reinforcing layer and has its front side provided with at least a semi-transparent front side coating with an optical surface quality which has been applied by injection molding.

An earlier German Patent Application P 41 24 297 discloses a method for injection molding, wherein the edges and seams of a blank with a reinforcing layer are sealed with a front side or surface coating. Whereas it was hitherto standard to provide the viewing or front side of the lining part that, for example, is composed of a wood layer, fabric layer or foil with a back surface reinforcement with a high-gloss lacquer coating, such a lacquer coating is superfluous in the earlier proposal because the front surface coating can be simultaneously produced with optical surface quality in the injection molding process.

The previous procedure of providing a lacquer coating had comprised therein that the lacquer was applied by spraying or atomizing onto the appertaining blank from the convex sides after it had been profiled, for example by bending in order, on the one hand, to obtain a desired sealing and, on the other hand, to obtain the optimally glossy surface. Lacquers of a polyester type, for example polyurethane, were utilized. However, it was necessary in most instances to also polish the lining part after the lacquering. In addition, laterally projecting noses and spurs composed of the lacquer material must be removed.

The disadvantage of this known procedure is that there were environmental problems which occurred because the lacquer proceeds into the ambient atmosphere when sprayed. In addition, there was the problem with not protecting the edges of the wood against the penetration of moisture or the like so that a protection must be applied in an additional work step.

By comparison thereto, the above-mentioned German Application 41 24 294 was already distinguished in that the perfect sealing of the finished lining part is possible and that the environmental problems are largely avoided. In the method of the earlier proposal, a high-gloss surface that did not require any after-polishing can be produced. It is possible to achieve a completed edge protection in a single work step, wherein the coating can be drawn all the way into the back surface of the lining part given an appropriate fashioning of the mold. A complete surface enhancement thus occurred to the extent that it was desired. The completed lining part had high dimensional accuracy because a "free" drying process is no longer necessary. No material is wasted, since only the amount of material required for the coating needed to be employed. In the method of the earlier proposal, the material is preferably employed for the coating that liquifies below the spontaneous ignition temperature of the blank. This is not only practical for manufacturing reasons; on the contrary, a later separation of the coating and blank and, thus, a recycling can also be possible. A liquified coating, for example, can be removed from the blank simply by dripping off or under the influence of a centrifuge.

The method of German Published Application No. 41 24 294 has definitely proven itself. However, the manufacture of a reinforcing layer, which is introduced into the injection mold together with the blank in a pre-shaped condition in the known method, presents difficulties and is relatively complicated.

SUMMARY OF THE INVENTION

It is an object of the present invention to improve the method of molding to the effect that the manufacture of the lining part composed of a blank, front side coating and reinforcing layer can be simplified given a further quality enhancement. In addition, the lining part having improved quality can be manufactured.

The objects of the present invention are inventively obtained wherein a blank is first introduced into a first mold part, which is a front mold part, having a surface on which the front surface of the blank essentially corresponds in the final contour of the blank from the viewing or front side, with the viewing side or front surface of the blank seated on the mold surface of the first mold; a second mold whose mold surface is fashioned with a first mold cavity corresponding to the desired dimensions of the reinforcing layer that is to be applied on the back side or surface of the blank, is brought together with the first mold part; subsequently, the reinforcing layer is injection molded in this first cavity with a first plastic material. Then, while retaining the blank with the reinforcing layer on the second mold part, the first mold part is replaced by a third mold part having a third mold surface which is fashioned to form a second molding cavity corresponding to the desired dimensions of the front surface coating that will be seen from the viewing side of the blank and then the front surface coating is injection molded in the second injection-molding step with a second plastic material.

If desired, the first plastic material and the second plastic material can be essentially identical. However, the first plastic material and the second plastic material can also have different characteristics. If desired, both the back or reinforcing coating and the front coating can be of the same thickness.

The invention further proceeds that the plastic material or materials employed will liquify or be liquid below a spontaneous ignition temperature of the blank.

One can also proceed in accordance with the present invention, wherein the processing of a blank provided with at least one cut-out, the mold halves are employed having molding surfaces so that the cut-out remains free of the reinforcing coating in the first injection molding step but is completely lined with the second or front surface coating on its edges and over possibly the back edges of the reinforcing coating during the second molding step. The invention also provides that all edge regions of the blank are coated with the front surface coating at least up to the back edges of the back coating as a result of an appropriate fashioning of the molding surface of the first, second and third molds. It is also possible that a reinforcing coating will be covered by the front surface coating close to the edged regions.

It also can be provided, according to the present invention, that the blank has its back surface provided with at least one functional element, such as a fastening element or the like, before being introduced into the first molding part; however, it is also possible that the fastening element or the like is introduced into the molding region and is joined to the blank during the first injection molding step. It can also be provided in the invention that the first, second and third molding parts have essentially vertically-arranged molding surfaces and that the blank is clamped in the first molding part before the first injection molding step.

The lining part of the invention is characterized in that the reinforcing layer of the blank is fashioned on the back surface of the blank by injection molding.

The lining part can have a blank which has at least one cut-out penetrating the blank. The invention also proposes that the front side coat cover the edge region of the blank, at least up to the edges of the back surface coating or reinforcing coating. In additional embodiments, the invention proposes a lining part which is characterized in that the front surface coat covers the back surface coat along the edge regions of the blank. It can also be provided that the cut-out or the outside edge corners provided with the front surface coating are provided with a radius of curvature amounting to zero and, thus, have sharp corners.

The invention is based on the surprising perception that one succeeds in further improving the method of German Published Application 41 24 297 by having the reinforcing layer being also manufactured of plastic material with an injection molding process. The injection mold is employed for this purpose that enables the manufacture of the backing or reinforcing coat, potentially upon inclusion of the function elements, in a first injection molding step in the claimed way, wherein the front surface coat is produced with a final optical surface quality and a second injection molding step using a second front molding part while retaining the original back molding part. With respect to its molding surfaces, the first front molding part is fashioned so that the blank presses firmly against the molding surface so that only a filling of the mold cavity between the back of the blank and the molding surface of the second molding part occurs in the first injection molding step, whereupon the first molding part is then separated. The semifinished goods composed of the blank and the back coating, which serves as a reinforcing layer, thereby remain adhered to the second mold part when the third mold part is then assembled. The molding surface of the third molding part is constructed so that the second molding cavity will occur between it and the blank and this second molding cavity is then filled with the plastic material in the second injection molding step.

It is especially advantageous when identical layer thicknesses are employed for the back surface coat and the front surface coat, since a high resistance of the manufactured lining part to thermal cycling, i.e., uniform shape stability, is then assured. The layer thicknesses, for example, can amount to 0.3 to 3 min. The plastic material, of course, can be not only a clear transparent material, but, for example, can also be colored or tinted in order to assure the desired optical impressions of the surface.

When the lining part is exposed to weather, it is recommendable to utilize a UV-resistant and/or weather-resistant material as a plastic material. Of course, the plastic material should also be scratch-resistant. Polymethyl metacrylates are an example of a preferred plastic material.

Of course, it is not only a potential profile and/or preshaped veneer part, such as a precious wood veneer, that can be planar but also curved that can be employed as the blank. In addition, the blanks composed of metal or plastic can also be utilized.

It is particularly advantageous that the cut-outs within the lining part can also be unproblematically produced and sealed, namely with freely-selectable edge radii, particularly an edge radius of zero. To this end, the blank is correspondingly punched or sawed in its uncoated condition. A particular advantage of the invention is thus that the radius-free cut-outs or corners can be produced and these are desirable for aesthetic reasons, for example upon integration of instruments in dashboards of motor vehicles.

Other advantages and features of the invention will be readily apparent from the following description of the preferred embodiments, the drawings and claims.

DESCRIPTION OF THE PREFERRED EMBODIMENTS

Figure 3:
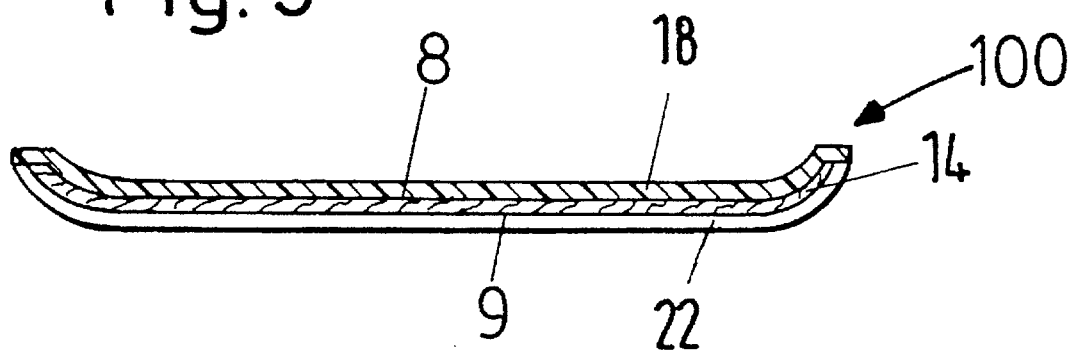
FIG. 3 is a cross sectional view of a lining part manufactured according to the invention as illustrated in FIGS. 1 and 2.

The principles of the present invention are particularly useful for forming a finished lining part, generally indicated at 100 in FIG. 3. The lining part 100 is composed of a blank 14, a back surface coating 18 and a front surface coating 22.

In order to form the lining part 100 of FIG. 3, the method of the present invention utilizes a first injection molding arrangement including a first injection part or member 12 and a second injection part or member 10. The first injection part 12 has a molding surface 13 which conforms to a front surface 9 of a blank 14. The blank 14 may be a pre-shaped blank composed of a wood veneer part which is clamped into the first mold formed by the first mold part 12 and a second mold part 10, which together have a cavity 16. As illustrated, the cavity 16 is between a mold surface 11 of the second mold part 10 and a back surface 8 of the blank 14. After forming the back surface coating 18 on the surface 8, then the first mold part 12 is replaced by a third mold part or member 17, which has a molding surface 19 spaced from the front surface 9 of the blank 14 to form a cavity 20.

Figure 1:
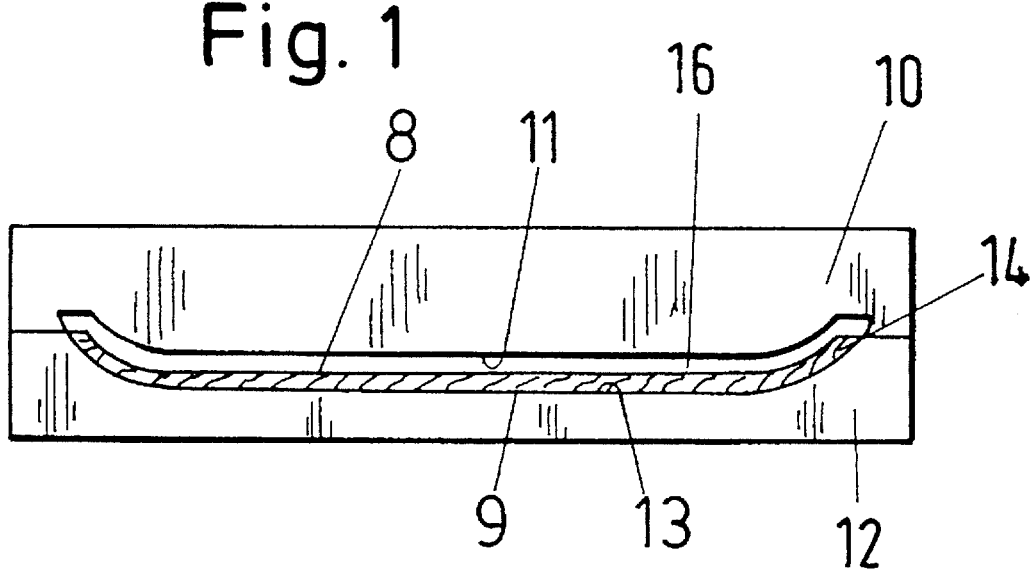
FIG. 1 is a cross sectional exemplary embodiment of the inventive injection mold used during the first injection molding step with the cross section taken substantially perpendicular to the plane of the part.
Figure 2:
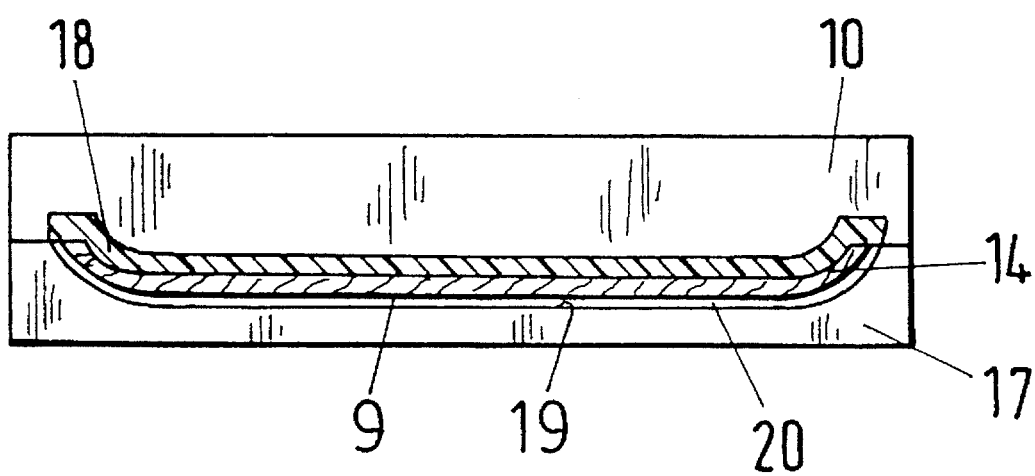
FIG. 2 is the injection mold used for the second injection molding step with those parts the same as FIG. 1 having the same element numbers.

The method of the invention is implemented in the following way given the illustrated exemplary embodiments. First, the blank 14 is brought into its ultimate shape outside of the injection mold, for example by embossing or the like, whereby it can not only be bent but can also be provided with cut-outs 30 and 31 of the blank 14a of FIG. 4. The blank 14, in fact, already has its ultimate shape in an unstressed condition, but is not shape-stable under stress because, for example, it is fashioned extremely thin in order to save material, particularly if it is made of precious woods. The blank 14 is then introduced into the first mold part 12 and is preferably clamped therein, wherein this is especially expedient given the molding surface 13. The molding surface 13 of the first mold part 12 is fashioned so that the viewing or front surface 9 of the blank situated in FIG. 1 will be pressed tightly and flushed against the molding surface 13 of the first mold part 12. Subsequently, the mold is closed by moving the second mold part 10 against the first mold part 12 or vice versa, wherein the first molding cavity 16 is formed between the back surface 8 of the blank 14 and the molding surface 11 of the second part 10. This molding cavity 16 is now filled with a plastic material with a first injection molding step and the back surface coating 18 is then formed as a result thereof. Subsequently, the two mold halves 10 and 12 are moved apart, wherein the semi-finished goods composed of the blank 14 and the back surface coating 18 will remain on the second mold part 10.

Then, the second mold part 10 is brought together with a third mold part 14, which is a second front mold, wherein a mold cavity 20 remaining between the molding surface 19 of the third mold part 17 and the front surface 9 of the blank 14 is provided. This mold cavity 20 is then filled with a plastic material in a second injection molding step. The front surface coating 22 is formed as a result thereof so that the finished lining part 100 of FIG. 3 will occur.

Figure 4:
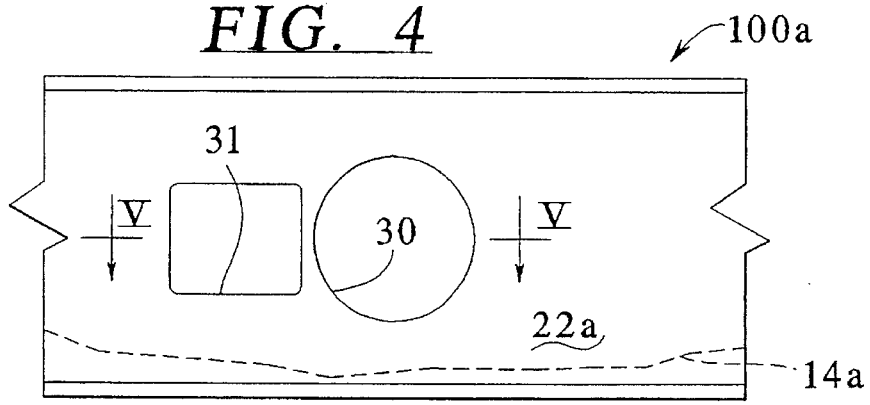
FIG. 4 is a partial front view of a lining part having cut-out portions in accordance with the present invention.
Figure 5:
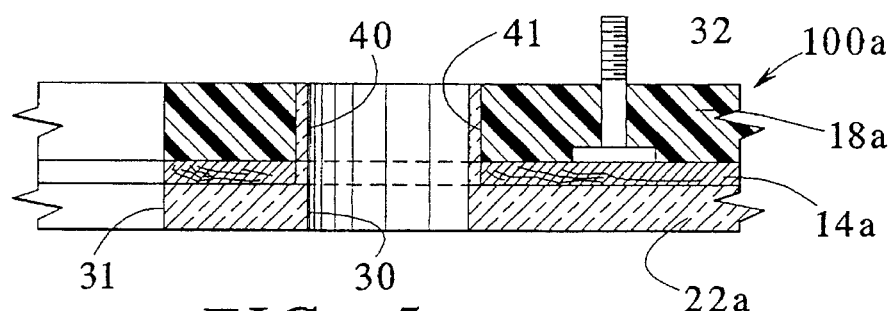
FIG. 5 is a cross sectional view taken along the lines V—V of FIG. 4.
Figure 6:
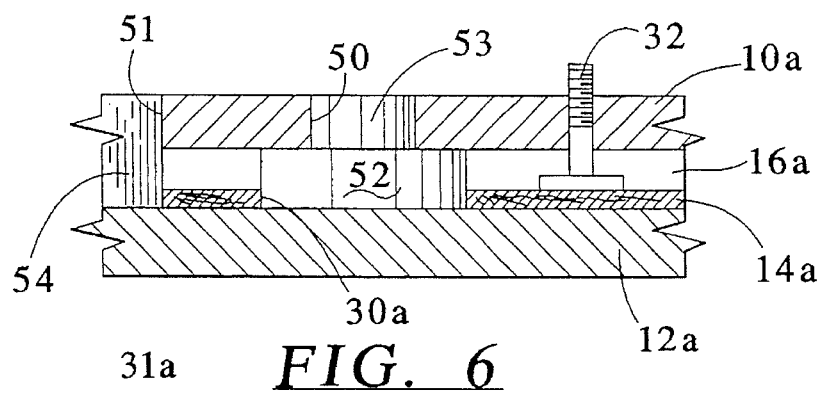
FIG. 6 is a partial cross sectional view with portions in elevation of the modified first and second die parts for forming the lining part of FIGS. 4 and 5.
Figure 7:
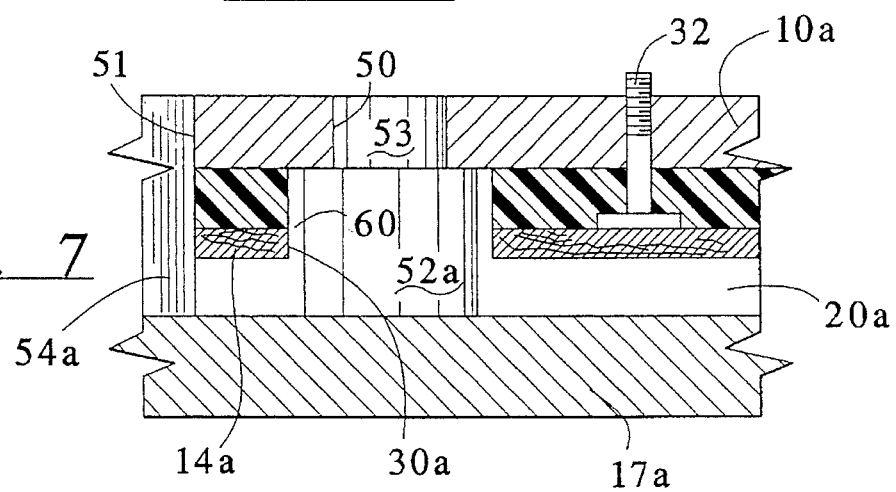
FIG. 7 is a partial cross sectional view with portions in elevation showing the modified first and third mold parts for forming the lining part of FIGS. 4 and 5.

In the embodiment illustrated in FIGS. 4 and 5, a lining part 100a has a circular cut-out 30 and a rectangular-shaped cut-out 31. In addition, it has a fastening element, such as a threaded member 32, extending from a rear surface of the blank 14a and out of the reinforcing or back surface layer 18a.

As illustrated in FIG. 5, the front surface layer 22a has a thin layer 40 which covers an edge 41 of the back surface layer 18a for the cut-out 30. However, the cut-out 31 is not provided with such a coating layer.

To form the lining part 100a of FIGS. 4 and 5, the first mold part 12a is provided with a projection 52 and a projection 54, which will receive cut-outs 30a and 31a of the blank 14a. As illustrated, these receive the cut-outs with no clearance. The projection 52 has a smaller projection 33, which is received in an opening 50 in the second mold part 10a, while the projection 54 is of a constant size and is received in an opening 51. In order to position or mount the fastening element 32, the second part 10a has an opening through which this part is received, and it is noted that the part may have a seal arrangement to prevent plastic from flowing through or around the threads. With the parts 10a and 12a assembled with the blank 14a on the molding surface of the first part 10a, a cavity 16a is produced and this is filled with the material forming the backing layer 18a. Subsequent to forming the backing layer 18a, the first mold part 12a is replaced by a third mold part 17a, which has a projection 52a and projection 54a. The projection 54a forms a tight fit with the opening 51 in the second mold part 10a, as did the projection 54 of the first part 12a. The projection 52a has a reduced size projection 53 to be received in the opening 50 and has a reduced diameter to provide an annular cavity portion 60 along the edge of the cut-out 30a of the blank 14a. Due to the change in size in the spacing of the mold surface of the third mold part 17a from the front surface of the blank, a second molding cavity 20a is formed and into this, the front surface layer 22a will be injection molded. Thus, the front layer 22a with the thin layer or lips 40 are formed by plastic that is injection molded into the cavity 20a.

Although various minor modifications may be suggested by those versed in the art, it should be understood that I wish to embody within the scope of the patent granted hereon all such modifications as reasonably and properly come within the scope of my contribution to the art.

I claim:

1. A method for manufacturing a lining part comprising a blank having a thin unstable shape being preformed with ornaments and written characters, said blank having a cut-out with an edge, said part having a back surface coating for reinforcing the part and a front transparent surface coating with an optical surface quality, the method comprising the steps of providing a first injection molding part having a first molding surface with a portion to be received in the cut-out, and a second molding part having a second molding surface, placing the blank against the first molding surface with the portion received in the cut-out, assembling the first and second molding parts together with the second molding surface of the second part being spaced from a back surface of the blank to form a first cavity, injection molding a first plastic material into the first cavity to form a back surface coating on the blank with the cut-out being free of said coating, then removing the first molding part and replacing it with a third molding part having a third molding surface with a surface portion extending into the cut-out, said second molding part being joined with the third molding part, with the third molding surface being spaced from a front surface of the blank and the edge of the cut-out to form a second molding cavity, injecting a second plastic material into the second molding cavity to form a front surface coating having the desired dimensions and surface features and a thin lining extending from the front surface coating around the edge of the cut-out to the back side of the back surface coating to thereby form the lining part.

2. In a method according to claim 1, wherein the first plastic material and the second plastic material are essentially the same.

3. In a method according to claim 1, wherein the first plastic material and the second plastic material are different.

4. In a method according to claim 1, wherein the back surface coating and the front surface coating are manufactured with essentially the same thickness.

5. In a method according to claim 1, wherein the first plastic material and second plastic material will become liquid at a temperature below the self-ignition temperature for the blank.

6. In a method according to claim 1, wherein all edge regions of the blank are aligned with the front surface coating at least up to the back side of the back surface coating as a result of an appropriate structure of the molding surfaces of the first and third molding parts.

7. In a method according to claim 6, wherein the back surface coating is covered by the front surface coating close to all edge regions.

8. In a method according to claim 1, wherein prior to introducing the blank into the first molding part, at least one fastening element is provided on the back surface of the blank.

9. In a method according to claim 1, wherein the second molding part receives a fastening element so that when the second molding part is assembled with the first molding part, the fastening element will be secured to the blank during the first injection molding step.

10. In a method according to claim 1, wherein the molding parts are positioned with their molding surfaces essentially being vertical surfaces and the blank is clamped to the first molding surface of the first molding part during the first molding step.

* * * * *